United States Patent Office 3,396,226
Patented Aug. 6, 1968

3,396,226
NONGRANULATED COMPRESSED TABLETS OF ASCORBIC ACID WITH MICROCRYSTALLINE CELLULOSE
Arnold Cavalli, Belleville, and Louis Magid, Clifton, N.J., assignors to Hoffmann-La Roche Inc., Nutley, N.J., a corporation of New Jersey
No Drawing. Filed Jan. 6, 1965, Ser. No. 423,825
5 Claims. (Cl. 424—280)

ABSTRACT OF THE DISCLOSURE

Compositions suitable for direct compression into tablets without prior granulation procedures and containing ascorbic acid having average particle sizes such that not more than about 60 percent of the weight thereof is retained on a 100 mesh screen, and at least about 30 percent of the weight thereof passes through a 200 mesh screen, microcrystalline cellulose and/or cornstarch having a high amylose content and a suitable lubricant or lubricant mixture, are disclosed along with methods of producing such tablets.

This invention relates, in general, to novel compositions and to a process for the production thereof. More particularly, the invention relates to ascorbic acid-containing compositions which are capable of being compressed directly into tablets; to a process for preparing such compositions; and to tablets produced therefrom.

Tablets which contain ascorbic acid as the active ingredient thereof, as well as processes for producing same, are well known in the prior art. It is also well known that only a relatively few crystalline or powdery pharmaceutical compounds are capable of being compressed directly into tablets using conventional tabletting equipment. Ascorbic acid, for example, is not directly compressible into tablets even though it is crystalline in nature. In tabletting ascorbic acid, it is the normal practice to prepare a granulation, which contains ascorbic acid in admixture with suitable excipients, and, subsequently, compressing such granulation into tablets.

In general, there are two widely recognized methods of preparing granulations. The first such method is a wet granulation process, while the second is a dry granulation process. The latter process is commonly referred to as "slugging."

The wet granulation process of the prior art involves several essential steps. The first step in the wet granulation process comprises forming a mixture of a majority of the various materials to be included in the tablet. In the second step, the mixture, obtained from the first step, is moistened with a suitable liquid which, optionally, contains a binding agent. In the third step, the moistened mixture is passed through a comminuating device to transform the moistened mixture into granules. Thereafter, in succeeding steps, the granules are dried and comminuted to provide particles of desired size, following which conventional lubricants are added thereto and mixed therewith. Finally, the granulation, which is thus obtained, is compressed into tablets using conventional tabletting equipment.

From a commercial point of view, the dry granulation process is somewhat more attractive than the wet granulation procedure, since it involves a fewer number of steps. In the dry granulation procedure, the ingredients which are to be included in the tablets are admixed, following which they are compressed into slugs, i.e., oversized tablets. These slugs are, by appropriate grinding, broken down into granules of substantially uniform size. The granules, thus obtained, are, in turn, compressed into tablets.

Because of the number of operations involved, and because of the time and equipment required, tabletting by the conventional wet and dry granulation processes of the art, leave much to be desired. The present invention provides a convenient and economically feasible means for producing ascorbic acid-containing tablets.

Thus, in its most comprehensive embodiment, the present invention is concerned with novel ascorbic acid-containing compositions.

In a more specific embodiment, the invention is concerned with ascorbic acid-containing compositions which are capable of being compressed into tablets without first granulating same.

In other embodiments, the invention is concerned with a process for producing the aforesaid ascorbic acid-containing compositions and with tablets produced from such compositions.

It has been found that when ascorbic acid, of a type described hereinafter, is admixed with (1) a microcrystalline cellulose and/or with a cornstarch having a high amylose content and (2) a suitable lubricant or lubricant mixture, in the presence or absence of other conventional excipients, the mixture, which is thus obtained, can be compressed directly into tablets having outstanding physical characteristics.

Ascorbic acid is marketed either in the form of a powder or as a crystalline material. The product is available in a variety of particle sizes. Depending upon the method and means employed in its comminution or crystallization, the size of the particles comprising commercially available ascorbic acid will vary within rather wide ranges. Thus, for example, particles of ascorbic acid can vary, in size, from very coarse to very fine. Moreover, within any particular batch of ascorbic acid, there will be variations in the size of the particles comprising same. The particle size of the ascorbic acid which is used in the practice of this invention has been found to be extremely important to the operability of the invention. The ascorbic acid which is employed in carrying out this invention must be of such average particle size that (1) not more than about 60% of the weight thereof is retained on a 100 mesh screen and (2) at least about 30% of the weight thereof passes through a 200 mesh screen. The ascorbic acid which is employed in the preferred embodiment of the invention is of such average particle size that from about 0% to about 60% by weight thereof is retained on a 100 mesh screen, from about 10% to about 50% thereof is retained on a 200 mesh screen and from about 30% to about 75% is passable through a 200 mesh screen, with the proviso that, in every instance, at least about 30% of the weight of such powder is passable through a 200 mesh screen. Obviously, certain commercially available ascorbic acid products will not have a screen analysis falling within the ranges set forth heretofore and, hence, the use of such products as the sole source of ascorbic acid is not encompassed by this invention. However, such ascorbic acid products can be blended or admixed with other ascorbic acid products, i.e., products having a different particle size, and the blends or mixtures thus obtained can be used herein if they have a screen analysis falling within the range set forth herein. As used herein, the expressions 100 mesh screen and 200 mesh screen denote screens having 100 openings per linear inch and 200 openings per linear inch, respectively.

In general, any commercially available microcrystalline cellulose can be employed in preparing the compositions of this invention. However, the microcrystalline cellulose product which is manufactured and sold by the American Viscose Corporation, Markus Hook, Pa., under the trade name, Avicel, is used in the preferred embodiment of the invention.

The cornstarch which is employed herein is a cornstarch which is characterized by its high amylose content. As used herein, the expression "high amylose content" denotes a cornstarch containing at least about 50% by weight of amylose. In the preferred embodiment of the invention there is used, as the high amylose content cornstarch component, the cornstarch which is sold by National Starch and Chemical Corporation, New York, N.Y., under the trade name Amylon. Amylon is reported to have an amylose content of 55% to 60% by weight.

The quantities of the various ingredients comprising the present products are variable within rather wide limits. Thus, for example, ascorbic acid will comprise up to about 80%, and, preferably, from about 60% to about 80%, of the weight of the final product. The microcrystalline cellulose component will comprise up to about 50%, and, preferably, from about 19% to about 39%, of the weight of the final product. Where a high amylose content cornstarch is used, in lieu of a microcrystalline cellulose, such ingredient will comprise up to about 50%, and, preferably, from about 19% to 39%, of the weight of the final product. If desired, a mixture of microcrystalline cellulose and high amylose content cornstarch can be employed. In such an embodiment, these components can be admixed in any proportion, but it is preferred to employ a mixture containing from about 20% to about 80% by weight of microcrystalline cellulose and 20% to 80% by weight of high amylose cornstarch.

As indicated heretofore, a lubricant is an essential component of the present products. As the lubricant there can be used a stearic acid salt, i.e., a metallic stearate, such as, calcium stearate, magnesium stearate, etc. In the alternative, there can be used a wax-like material, for example, a wax-like saturated fatty acid, a wax-like mixture containing two or more saturated fatty acids or a wax-like hydrogenated glyceride, in admixture with a metallic stearate and/or titanium dioxide. The quantity of lubricant present in the products has a great influence on the properties thereof. In all of its embodiments, the invention contemplates the use of a quantity of lubricant sufficient to provide a mixture having satisfactory flow and compressibility properties. The present products are such that this is accomplished, generally, by the use of an amount of lubricant which is substantially less than that required in conventional prior art tabletting formulations. Thus, for example, where a metallic stearate is used, either alone or in combination with a wax-like material, the quantity employed should not exceed about 0.07% of the weight of the product. Where a wax-like material is used in combination with a metallic stearate and/or titanium dioxide, the quantity of wax-like material used should not exceed about 3.0% of the weight of the product. Where used in combination with a wax-like material, the quantity of titanium dioxide employed will not ordinarily exceed about 5.0% of the weight of the product.

As optional components, the present products can contain such other excipients as are found, ordinarily, in medicinal and pharmaceutical tablets. These include, for example, spray dried lactose, dextrine, amylose, etc.

The compositions of this invention are readily prepared by mixing a suitable ascorbic acid with microcrystalline cellulose and/or high amylose content cornstarch and with the lubricant or lubricant mixture. A composition, thus prepared, can be compressed directly, i.e., without first granulating same, into tablets having outstanding physical characteristics. Such characteristics include, for example, hardness, whiteness and color stability.

The manner in which the compositions of the invention are tabletted will be readily apparent to persons skilled in the art. In general, conventional procedures and techniques utilizing ordinary equipment, will be employed in formulating the compositions of this invention into tablets. Specific illustrations of the production of tablets from the compositions disclosed herein will be found in the examples which follow hereinafter.

For a fuller understanding of the nature and objects of this invention reference may be had to the following examples which are given as further illustration of the invention and are not to be construed in a limiting sense. All parts given in the examples are parts by weight unless otherwise indicated.

Example 1

In this example, 262.5 grams of ascorbic acid and 79.0 grams of microcrystalline cellulose were intimately admixed. The ascorbic acid was of such particle size that 100% by weight thereof passed through a 100 mesh screen, 29% by weight thereof was retained on a 200 mesh screen and 71% by weight thereof passed through a 200 mesh screen. To this mixture therewas added 10.0 grams of cornstarch, 7.5 grams of talc and 7.5 grams of calcium stearate. The mixture was admixed until all of the ingredients were uniformly distributed throughout.

Thereafter, the mixture was compressed, using ⅜" deep concave punches to tablets weighing 370 mg. The tablets, thus obtained, had good hardness and whiteness and color stability characteristics.

The microcrystalline used in this example was the product sold by the American Viscose Corporation, Markus Hook, Pa., under the trade name Avicel.

Example 2

In this example, a mixture was prepared using the following named ingredients in the proportions hereinafter indicated:

| | Parts |
|---|---|
| Ascorbic acid | 510.0 |
| Avicel (microcrystalline cellulose) | 187.0 |
| Calcium stearate | 3.0 |

The ascorbic acid employed was of such particle size that about 16% by weight thereof was retained on a 100 mesh screen, 44% by weight thereof was retained on a 200 mesh screen and 36% by weight thereof was passable through a 200 mesh screen.

The mixture, described in the preceding paragraph, was compressed into tablets of 700 mg. weight using a standard 15/32" flat-scored, bevelled punch. The tablets, thus otbained, had outstanding hardness and whiteness and color stability characteristics.

Example 3

In this example, the following named ingredients were admixed in the proportions hereinafter indicated:

| | Parts |
|---|---|
| Ascorbic acid | 510.0 |
| Avicel (microcrystalline cellulose) | 187.0 |
| Calcium stearate | 3.0 |

The ascorbic acid which was used had a particle size such that all of the powder passed through a 100 mesh screen, 29% by weight thereof was retained on a 200 mesh screen and 71% by weight thereof passed through a 200 mesh screen.

The mixture, thus obtained, was compressed, using conventional 15/32" flat-scored, bevelled punches to tablets weighing 685 mg. The tablets had outstanding hardness, whiteness and color stability characteristics.

Example 4

A dry, free-flowing composition was prepared using the following named ingredients in the proportions hereinafter indicated:

| | Parts |
|---|---|
| Ascorbic acid | 510.0 |
| Avicel (microcrystalline cellulose) | 187.0 |
| Calcium stearate | 3.0 |

The ascorbic acid used had a particle size such that 50% by weight thereof was retained on a 100 mesh screen, 14.5% was retained on a 200 mesh screen and 35.5% by weight was passable through a 200 mesh screen As in the preceding example, the mixture was compressed into tablets of 700 mg. weight using 15/32" flat-scored bevelled punches. The tablets, thus obtained, were found to have outstanding hardness, whiteness and color stability characteristics.

Example 5

A composition was produced from a mixture comprising 510.0 parts of ascorbic acid, 187.0 parts of Avicel, and 3.0 parts of calcium stearate. The ascorbic acid employed was such that 34% by weight thereof was retained on a 100 mesh screen, 36% by weight thereof was retained on a 200 mesh screen and 30% by weight thereof was passable through a 200 mesh screen.

The mixture, thus obtained, was compressed into a tablet, weighing 700 mg., using a standard 15/32" flat-scored, bevelled punch. The tablets, thus obtained, exhibited outstanding hardness, whiteness and color stability characteristics.

Example 6

In this example, a mixture was prepared containing the following named ingredients in the quantities hereinafter indicated:

| | Parts |
|---|---|
| Ascorbic acid | 510.0 |
| Avicel (microcrystalline cellulose) | 187.0 |
| Calcium stearate | 3.0 |

The ascorbic acid employed was of such particle size that about 8% by weight thereof was retained on a 100 mesh screen, 38.5% by weight thereof was retained on a 200 mesh screen and 53.5% by weight thereof was passable through a 200 mesh screen.

The mixture, thus obtained, was subsequently compressed using a conventional 15/32" flat-scored, bevelled punch, to form tablets of 700 mg. weight. Such tablets possessed outstanding hardness, whiteness and color stability characteristics.

Example 7

A composition was produced by mixing 510.0 parts of ascorbic acid, 187.0 parts of Avicel and 3.0 parts of calcium stearate. The ascorbic acid used was of such particle size that 46% of the weight thereof was retained on a 100 mesh screen, 24% by weight thereof was retained on a 200 mesh screen and 30% by weight thereof was passable through a 200 mesh screen.

The mixture, thus obtained, was subsequently compressed, using conventional 15/32" flat-scored, bevelled punches to form tablets of 700 mg. weight. The tablets thus produced exhibited outstanding hardness, whiteness and color stability characteristics.

Example 8

In this example, the following ingredients were admixed in the quantities hereinafter indicated:

| | Parts |
|---|---|
| Ascorbic acid | 510.0 |
| Avicel (microcrystalline cellulose) | 200.0 |
| Hystrene 4516 | 15.0 |
| Titanium dioxide | 5.0 |

The ascorbic acid used was a mixture of (1) 255.0 parts of an ascorbic acid haivng a particle size such that 29% by weight thereof was retained on a 200 mesh screen and 71% by weight thereof passed through a 200 mesh screen and (2) 255.0 parts of an ascorbic acid having a particle size such that 14% by weight thereof was retained on a 50 mesh screen, 25% by weight thereof was retained on a 60 mesh screen, 58% by weight thereof was retained on an 80 mesh screen, 2.0% by weight thereof was retained on a 100 mesh screen and 1.0% by weight thereof was passable through a 100 mesh screen. The composite ascorbic acid product, accordingly, had a particle size such that 49.5% by weight thereof was retained on a 100 mesh screen, 15.0% by weight thereof was retained on a 200 mesh screen and 35.5% by weight thereof being passable through a 200 mesh screen. The 50, 60 and 80 mesh screens referred to herein denote screens having 50, 60 and 80 openings, respectively, per linear inch.

The component, Hystrene 3516, which was used in this formulation, is a product comprising a mixture of saturated fatty acids marketed by Humko Products Chemical Division of National Dairy Products Corporation, Memphis, Tenn. Hystrene 4516 is reported to contain 1% myristic acid, 45% palmitic acid and 54% stearic acid.

The mixture was compressed to tablets of 730 mg. weight using 15/32" flat-scored, bevelled punches. Tablets having outstanding hardness, whiteness and color stability characteristics were thus obtained.

Example 9

In this example, the following named ingredients were admixed in the proportions hereinafter indicated:

| | Parts |
|---|---|
| Ascorbic acid | 510.0 |
| Avicel (microcrystalline cellulose) | 200.0 |
| Stearic acid | 10.0 |
| Magnesium stearate | 0.5 |

The blend of ascorbic acids, described in Example 8, was employed in producing this mixture.

The mixture, thus obtained, was compressed, using 15/32" flat-scored, bevelled punches, to tablets of 720 mg. weight. The tablets which were produced exhibited excellent hardness, whiteness and color stability characteristics.

Example 10

In this example, the following named ingredients were admixed in the proportions hereinafter indicated:

| | Parts |
|---|---|
| Ascorbic acid | 510.0 |
| Avicel (microcrystalline celluose) | 200.0 |
| Durkee 82 | 10.0 |
| Calcium stearate | 0.6 |

The ascorbic acid component used herein was the blend described in Example 8. The ingredient, Durkee 82, is a glyceride of hydrogenated oils marketed by Durkee Famous Foods, Division of The Glidden Company, New York, N.Y.

The mixture, thus obtained, was compressed into tablets weighing 721 mg. using 15/32" flat-scored, bevelled punches. The tablets which were produced exhibited excellent hardness, whiteness and color stability characteristics.

Example 11

In this example, the following named ingredients were admixed in the proportion hereinafter indicated:

| | Parts |
|---|---|
| Ascorbic acid | 510.0 |
| Avicel (microcrystalline cellulose) | 180.0 |
| Hystrene 4516 | 10.0 |
| Spray dried lactose | 60.0 |
| Zinc stearate | 2.0 |

The ascorbic acid which was used in formulating the mixture was the same blend employed in Example 8.

The mixture, thus obtained, was compressed, uing 15/32" flat-scored, bevelled punches, to tablets of 762 mg. weight. The tabets which were produced exhibited satisfactory hardness, whiteness and color stability characteristics.

Example 12

(a) In this example, there was prepared a mixture containing the following named ingredients in the proportions hereinafter indicated:

| | Parts |
|---|---|
| Ascorbic acid | 510 |
| Amylon | 187 |
| Calcium stearate | 3 |

The ascorbic acid used was such that 29% by weight thereof was retained on a 200 mesh screen and 71% by weight thereof passed through a 200 mesh screen. The component, Amylon, is a high amylose content cornstarch product, marketed by the National Starch and Chemical Corporation, New York, N.Y.

The mixture, thus obtained, was compressed into tablets of 700 mg. weight using a 15/32" flat-scored, bevelled punch. Tablets having outstanding hardness, whiteness and color stability characteristics were thus obtained.

(b) To a mixture identical to that described in section (a) of this example, there was added 50 parts of Avicel. The mixture, thus obtained was tabletted as described in section (a). The tablets obtained had excellent hardness, whiteness and color stability characteristics.

We claim:
1. A composition, directly compressed into tablets without first wet or dry granulating same, consisting essentially of a mixture of (1) from about 60 percent to about 80 percent by weight of ascorbic acid, (2) from about 19 percent to about 50 percent by weight of microcrystalline cellulose, and (3) at least one lubricant selected from the group consisting of metallic stearates, wax-like saturated fatty acids, wax-like hydrogenated glycerides and titanium dioxide, said ascorbic acid being of such particle size that not more than 60 percent by weight thereof is retained on a 100 mesh screen, from about 10 percent to about 50 percent by weight thereof being retained on a 200 mesh screen and from about 30 percent to 75 percent by weight thereof being passable through a 200 mesh screen.

2. The composition of claim 1 wherein the lubricant is a metallic stearate and wherein said metallic stearate comprises up to about 3.0% by weight of the composition.

3. The composition of claim 1 wherein the lubricant is a mixture of a wax-like material with a member selected from the group consisting of a metallic stearate and titanium dioxide and wherein the wax-like material comprises up to about 3.0% by weight of the composition.

4. The composition of claim 3 wherein the metallic stearate is present in a quantity of up to about 0.07% by weight of the composition.

5. The composition of claim 3 wherein titanium dioxide is present in a quantity up to about 5.0% by weight of the composition.

References Cited

UNITED STATES PATENTS

| | | | |
|---|---|---|---|
| 2,887,436 | 5/1959 | Klioze et al. | 167—81 |
| 2,887,437 | 5/1959 | Klioze et al. | 167—81 |
| 3,116,204 | 12/1963 | Siegel et al. | 167—81 |
| 3,146,168 | 8/1964 | Battista | 167—82 |

OTHER REFERENCES

Chem. Abstracts 54: p. 922 OL (1960).

Kwan et al: J. Pharm. Sci. 55 (3): 340–343 (1966) "Evaluation of Amylose as a Dry Bindee for Direct Compression."

Raier et al.: J. Pharm. Sci. 55 (5): 510–514 (1966), "Microcrystalline Cellulose in Tabletting."

LEWIS GOTTS, *Primary Examiner.*

S. K. ROSE, *Assistant Examiner.*

UNITED STATES PATENT OFFICE
CERTIFICATE OF CORRECTION

Patent No. 3,396,226

August 6, 1968

Arnold Cavalli et al.

It is certified that error appears in the above identified patent and that said Letters Patent are hereby corrected as shown below:

Column 8, line 2, "3.0%" should read -- 0.07% --; line 25, "Bindee" should read -- Binder --.

Signed and sealed this 10th day of February 1970.

(SEAL)
Attest:

Edward M. Fletcher, Jr.
Attesting Officer

WILLIAM E. SCHUYLER, JR.
Commissioner of Patents